United States Patent [19]

Suzuki et al.

[11] Patent Number: 4,562,917
[45] Date of Patent: Jan. 7, 1986

[54] FIXED QUANTITY FEED APPARATUS FOR BEAN SPROUTS

[75] Inventors: Tomosaburo Suzuki, Tsukui; Sanji Kawakami, Josui-Minami, both of Japan

[73] Assignee: Kabushiki Kaisha Daisei Kikai, Tokyo, Japan

[21] Appl. No.: 527,845

[22] Filed: Aug. 30, 1983

[30] Foreign Application Priority Data

Sep. 20, 1982 [JP] Japan ................. 57-163757

[51] Int. Cl.⁴ .............. G01G 11/02; G01G 11/08; G01G 13/16
[52] U.S. Cl. ........................... 198/505; 83/77; 131/108; 131/909; 177/50; 414/21; 425/142; 425/148; 425/296; 425/371
[58] Field of Search .......... 198/502, 504, 505, 507; 425/140, 142, 145, 148, 238, 296, 299, 301, 302.1, 304, 306, 307, 308, 310–313, 369, 370, 371, 527; 99/537, 538; 177/71, 119, 120, 50, 145; 83/77; 222/56; 131/108, 109 AB, 117, 909; 414/21

[56] References Cited

U.S. PATENT DOCUMENTS

| | | | |
|---|---|---|---|
| 2,124,219 | 7/1938 | Wheeler | 198/505 X |
| 3,670,792 | 6/1972 | Claussen | 198/456 X |
| 4,133,455 | 1/1979 | Moser | 198/504 X |
| 4,216,689 | 8/1980 | Suhling | 83/77 |
| 4,234,102 | 11/1980 | Spurgeon | 198/505 X |
| 4,416,368 | 11/1983 | Muramatsu et al. | 198/604 |

*Primary Examiner*—Joseph E. Valenza
*Assistant Examiner*—Lyle Kim
*Attorney, Agent, or Firm*—Oblon, Fisher, Spivak, McClelland & Maier

[57] ABSTRACT

A fixed quantity feed apparatus which includes a feeding device for shaping various kinds of articles such as bean sprouts, various cut vegetables, spaghetti and noodles, into the form of belt and conveying them, a weighing device for detecting that the articles which are being conveyed by the feeding device have reached a predetermined weight, and a dividing-feeding device for splitting up the belt-shaped articles when the weighing device has detected the predetermined weight, wherein the articles are divided by the fixed weight and fed to a packing device or the like, while they are continuously conveyed.

8 Claims, 7 Drawing Figures

FIXED QUANTITY FEED APPARATUS FOR BEAN SPROUTS

BACKGROUND OF THE INVENTION

1. Field of the Invention

The present invention relates to a fixed quantity feed apparatus for dividing, by a fixed quantity, various kinds of articles, in particular agricultural and marine products which are indeterminate in form and have been hitherto difficult to feed quantitatively, for example bean sprouts, various cut vegetables, and various kinds of foods, for example spaghetti, noodle or the likes, and feeding them. (These agricultural and marine products and foods will be hereinafter called "bean sprouts" in the specification of the present application.)

2. Discussion of the Background

For packing and sealing bean sprouts by a fixed quantity, there have been provided various apparatus for quantitatively feeding these articles. However, there is earnestly desired an apparatus simple in structure which is capable of effecting the fixed quantity feed of these articles with accuracy.

SUMMARY OF THE INVENTION

The present invention has an object of providing an apparatus which satisfies this requirement, and is characterized by adopting a weighing device for weighing bean sprouts continuously fed via a belt to achieve this object.

It is another object of the present invention to provide a fixed quantity feed apparatus in which the weight of the articles dividedly fed is of minor unevenness.

It is a further object of the present invention to provide an apparatus which can divide the articles by a predetermined weight to effect their fixed quantity feed, while they are continuously conveyed, whereby their high-speed processing is possible.

The present invention has also an object of providing a fixed quantity feed apparatus in which a weighing device is adopted which weighs the articles while their conveyance is effected.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
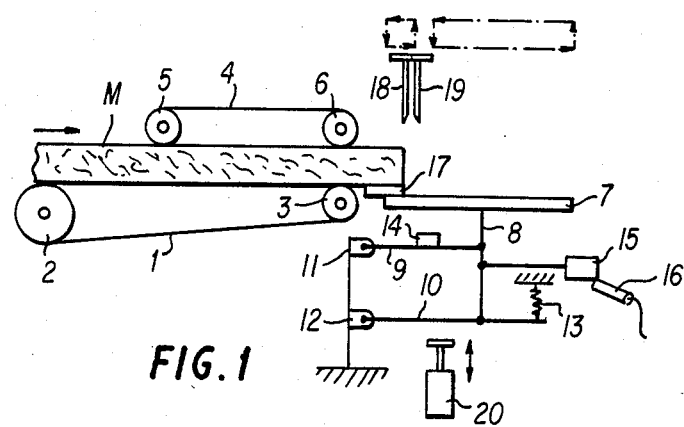
FIGS. 1 to 5 are elevational views showing the composition and stage-by-stage actuation of the first embodiment thereof.

The apparatuses according to the present invention will be concretely described below with reference to the embodiments shown in the drawings.

In FIG. 1, reference numeral 1 represents an endless belt conveyor stretched between rollers 2, 3, and reference numeral 4 indicates a second endless belt conveyor stretched between rollers 5, 6 over the same belt conveyor 1.

Side plates or side endless belt conveyors (not shown) are provided on both sides of the belt conveyors 1, 4, and these belt conveyors constitute a feeding device for shaping bean sprouts M to be quantitatively fed into the form of a belt and conveying them to the direction of an arrow.

Reference numeral 7 represents a weighing dish arranged so as to be almost in the same plane as the travelling plane of the belt conveyor 1, and a link 8 is fixed on the back side of the weighing dish 7.

The link 8 has two links 9, 10 pinned at an interval thereon. The other ends of the links 9, 10 are pinned on proper supports 11, 12, respectively.

On the other hands, the fore end of the link 10 is pulled upward by a weighing spring 13.

The weighing dish 7 is therefore displaced downward as well as a spring balance, with stretching the weighing spring 13 by way of the links 8, 9, 10, in response to a weight placed thereon.

Reference numeral 14 represents a stopper which collides with the link 9 to restrict the lifting of the weighing dish 7 caused by the weighing spring 13.

A shading plate 15 is fitted to the link 8, and a sensor 16 is arranged which detects the fact that said shading plate 15 has descended to a given position in response to the displacement of the weighing dish 7.

Reference numeral 17 is a plate connecting the belt conveyor 1 and the weighing dish 7.

A dividing-feeding device for splitting up the belt-shaped bean sprouts conveyed onto the weighing dish 7 by the belt conveyor 1 by a fixed quantity, is arranged over the weighing dish 7.

This dividing-feeding device has two rows of comb-like pins 18, 19 to be pierced into the belt-shaped bean sprouts which are continuously being fed onto the weighing dish 7.

Both the comblike pins 18, 19 pierce the bean sprouts M and move with the conveyance of the bean sprouts M, and then are caused to ascend and retreat so as to return to the original position again.

When the pins 18, 19 pierce the bean sprouts M and move ahead together with the bean sprouts, the pin 19 which is in the front position in the feeding direction of the bean sprouts M is moved at a high speed relatively to the pin 18. The moving loci of said pins 18, 19 are graphically shown over the pins 18, 19 in the drawings. By this relative movement of the pins 18, 19, the bean sprouts are forward sent out dividedly by the weighed fixed quantity on the weighing dish 7.

As for the detailed example of the structure and operation of said pins 18, 19, there may be properly adopted the mechanism disclosed in the official gazette of Utility Model Laying-Open No. 57083/52 or the like.

In addition, the reference numeral 20 in the drawing represents a stopper pusher which serves to prevent the descended weighing dish from descending over a given extent, when the bean sprouts are weighed quantitatively, and to lift up the weighing dish 7 when the dividing operation by the pins 18, 19 is carried out.

The operation of the above-mentioned fixed quantity feed apparatus will be described with reference to FIGS. 2 to 5.

Figure 2:
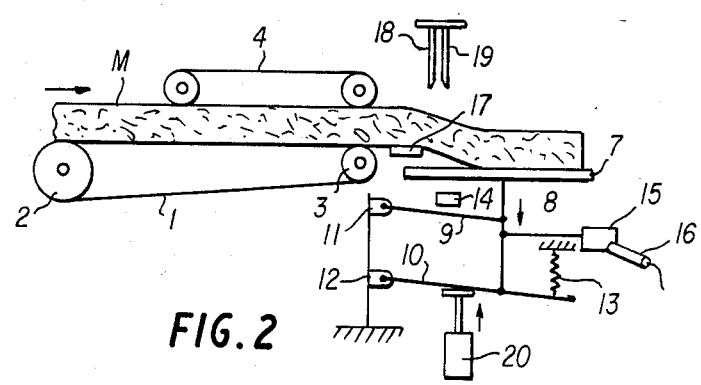

In FIG. 2, the bean sprouts M are continuously fed onto the weighing dish 7 by the belt conveyors 1, 4, and the weighing dish 7 is caused to descend gradually by the weight of the bean sprouts M, while resisting the spring 13 by way of the links 8, 10. When a fixed quantity of the bean sprouts M have been transferred to the weighing dish 7, the shading plate 15 intercepts the beam of light onto the senser 16 so as to detect that the fixed quantity of the bean sprouts M have been transferred to the weighing dish 7.

Under this condition, the link 10 collides with the stopper pusher 20 and its further descent is restrained.

Figure 3:
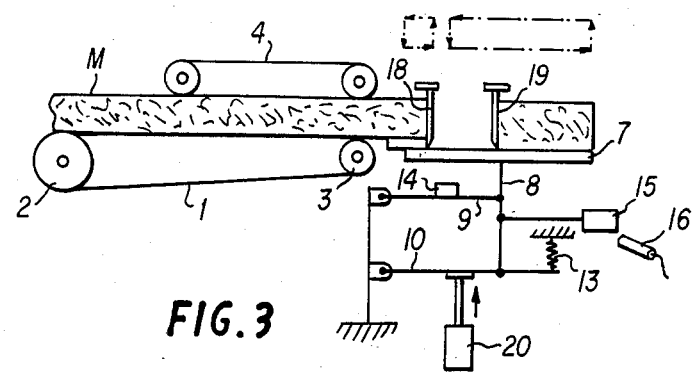

Also under this condition, the stopper pusher 20 extends its piston so as to lift up the weighing dish 7 to the original position, as shown in FIG. 3.

Under the state where the weighing dish 7 has been lifted up, the pins 18, 19 pierce the bean sprouts M, as mentioned above, to thereby divide quantitatively the bean sprouts M on the weighing dish 7, as shown in FIG. 3.

Figure 4:
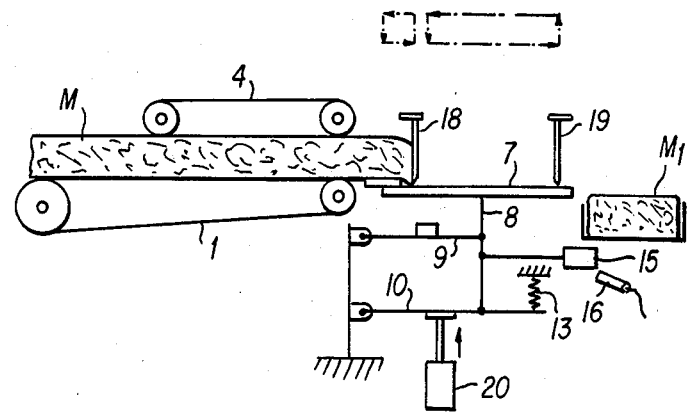

The condition wherein the bean sprouts M have been quantitatively divided on the weighing dish 7 and the fixed quantity of the bean sprouts $M_1$ has been discharged, is illustrated in FIG. 4.

Figure 5:
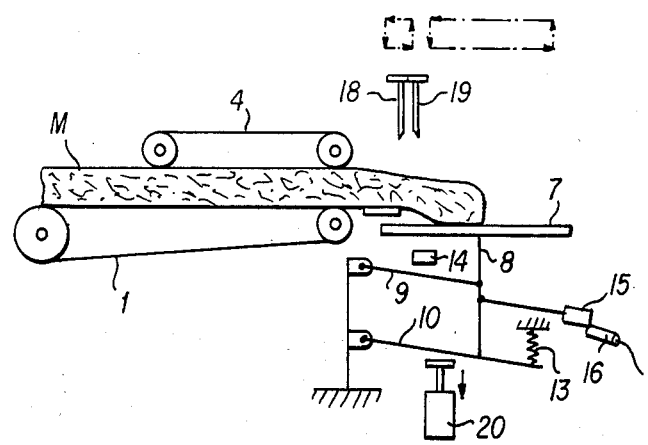

Then, the pins 18, 19 are returned to the original positions, and the stopper pusher 20 is also returned to its original position so that the next quantitative dividing operation can start. This condition is shown in FIG. 5.

The second embodiment shown in FIG. 6 will be described below.

Figure 6:
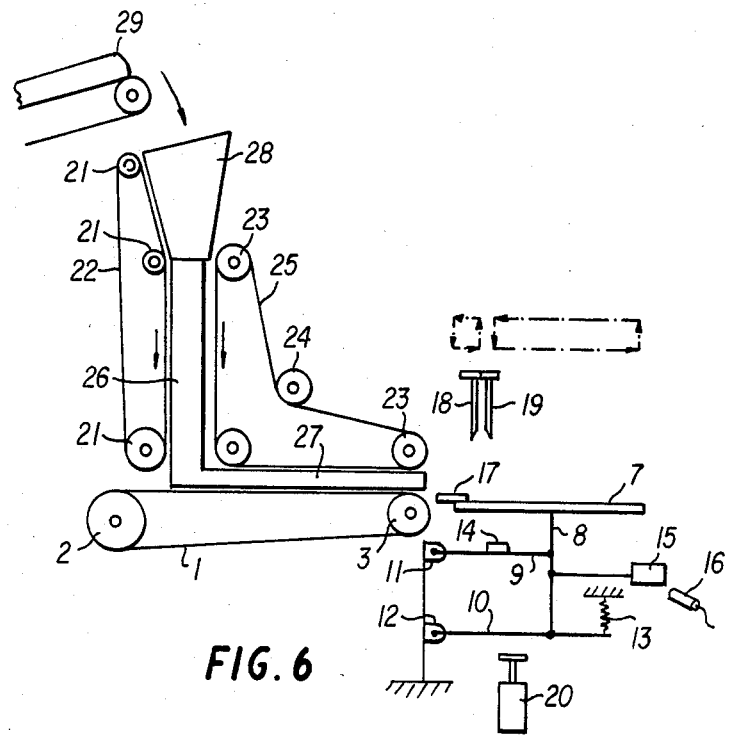
FIGS. 6 and 7 are elevational views showing another embodiment, respectively.

In the apparatus shown in FIG. 6, a gravitational feeding passage, in which the four sides thereof are surrounded by two guide plates 26 juxtaposed at a predetermined interval, an endless belt 22 stretched on guide rollers 21 and an endless belt 25 stretched on guide rollers 23, 24 are utilized in order to shape the bean sprouts into the form of a belt of material and feed it, while two endless belts 1, 4 are adopted in a manner similar to the apparatus shown in FIGS. 1 to 5.

The endless belt 25 is formed in an L-shape at its lower portion, and two spaced guide plates 27 are arranged between the lower portion of the endless belt 25 and the belt 1. At the top opening of this gravitational feeding passage, a hopper 28 is provided and which faces the feeding passage, through which the bean sprouts are fed to the gravitational feeding passage by a feeding belt 29.

The endless belts 22, 25 are moved in the direction of arrows and serve to shape the bean sprouts thrown thereto from the hopper 28 into the form of belt with an almost constant density and then serves to feed them to the weighing dish 7.

The composition of the weighing device is the same as that of the above-mentioned embodiment and the same numerals are given to the corresponding portions, and accordingly the description thereof is omitted.

In addition, it is desired to refer to the official gazette of Patent Publication No. 37446/55, as for the detailed example of the gravitational feeding passage.

Figure 7:
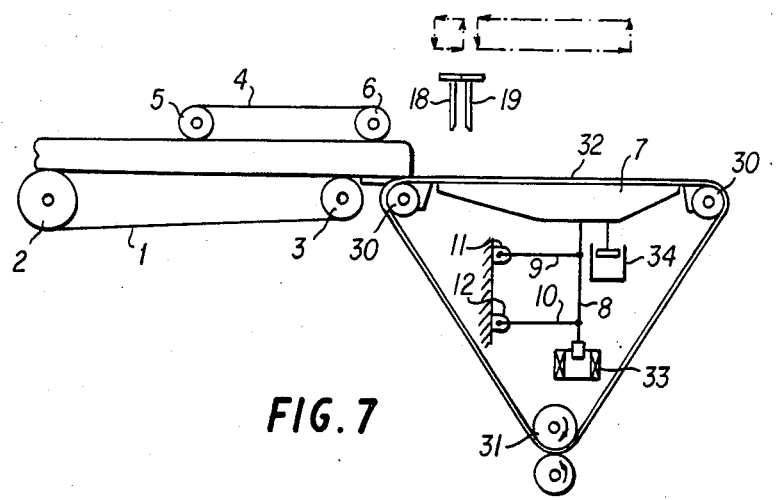

The third embodiment shown in FIG. 7 will now be described. In the embodiment of FIG. 7, a conveying mechanism is adopted in the weighing dish that receives the bean sprouts which are being fed therein in the form of belt.

Namely, an endless belt 32 is stretched between guide rollers 30 and a pair of driving rollers 31 so as to travel along the top side of the weighing dish 7. A differential transformer 33 is provided at the bottom end of a link 8, and a damper 34 is fitted to the weighing dish 7 to dampen its vertical movement. As for the other parts of the apparatus of FIG. 7, the same numerals are given to the similar portions to the former embodiments, and the description thereof is accordingly omitted.

In the embodiment shown in FIG. 7, the weighing dish 7 is caused to descend by the weight of the bean sprouts which are being fed thereinto, while the bean sprouts are conveyed by the endless belt 32, and it is detected by the actuation of the differential transformer 33 that the weight has reached a predetermined one.

Since the fixed quantity feed apparatus for bean sprouts according to the present invention is of one in which the bean sprouts are shaped into the form of belt and continuously fed, and they are divided for fixed quantity feed by the dividing-feeding device, when it is detected by the weighing device that the weight of the bean sprouts has reached a predetermined weight, as described above, it can weigh the bean sprouts with accuracy, and continuously feeding them, whereby their fixed quantity feed can be carried out.

A feeding device for feeding bean sprouts in the form of belt is permitted to be simple in structure, because there is no need to strictly shape the bean sprouts into the form of a belt with a constant density for their feeding.

According to the feed apparatus of the present invention, such is capable to carry out the fixed quantity feed of bean sprouts which are difficult to feed quantitatively because of their mutual intertwisting, at a $\frac{1}{3}$ to $\frac{1}{2}$ error as compared with a conventional apparatus.

In addition, it is needless to say that a load cell system or proper means may be adopted for the detecting means of the weighing device, although the shading plate and senser or the differential transformer are used in the above-mentioned embodiments, and other proper means may be also adopted for the dividing-feeding device in place of the pins shown in the drawings.

Obviously, numerous modifications and variations of the present invention are possible in light of the above teachings. It is therefore to be understood that within the scope of the appended claims, the invention may be practiced otherwise than as specifically described herein.

We claim:

1. A fixed quantity feed apparatus for material, which comprises:
   a feeding device for shaping said material to be quantitatively fed into the form of belt and conveying them;
   a weighing device to which the material coming out of the feeding device is fed, and which further comprises means for detecting a predetermined weight of said material; and
   a dividing-feeding device located between said feeding device and said weighing device for splitting up the material after the weighing device has detected the predetermined weight.

2. A fixed quantity feed apparatus, as set forth in claim 1, in which said feeding device for conveying the material in the form of belt is composed of two endless belts arranged vertically at an interval.

3. A fixed quantity feed apparatus, as set forth in claim 1, in which said feeding device for conveying the material in the form of belt has a passage formed in an L-shape with travelling endless belts.

4. A fixed quantity feed apparatus, as set forth in claim 1, in which said weighing device has a conveying structure including an endless belt stretched over the weighing device.

5. A fixed quantity feed apparatus, as set forth in claim 1, wherein said feeding device further comprises a horizontal feeding device.

6. A fixed quantity feed apparatus, as set forth in claim 1, wherein said weighing device further comprises a weighing dish and a stopper pusher mechanism connected to said weighing dish to assist in support of said dish upon loading of said dish with said material.

7. A fixed quantity feed apparatus, as set forth in claim 6, further comprising a shading plate connected to said weighing dish and sensor means associated with said shading plate for detecting a fixed quantity of said material upon movement of said shading plate.

8. A fixed quantity feed apparatus, as set forth in claim 1, wherein said dividing feeding device further comprises a first and second comb-like pin member and means for moving said first and second pins in a parallel direction and subsequently moving said second pin in a direction of travel of said material.

* * * * *